United States Patent
Huang

(10) Patent No.: US 11,839,890 B2
(45) Date of Patent: Dec. 12, 2023

(54) ALL-PLASTIC MINIATURIZED SPRAY GUN

(71) Applicant: YUYAO AOHONG PLASTICS CO., LTD, Ningbo (CN)

(72) Inventor: Honghu Huang, Ningbo (CN)

(73) Assignee: YUYAO AOHONG PLASTICS CO., LTD, Ningbo (CN)

( * ) Notice: Subject to any disclaimer, the term of this patent is extended or adjusted under 35 U.S.C. 154(b) by 0 days.

(21) Appl. No.: 17/733,259

(22) Filed: Apr. 29, 2022

(65) Prior Publication Data
US 2023/0058932 A1 Feb. 23, 2023

(30) Foreign Application Priority Data

Aug. 19, 2021 (CN) .......................... 202110954269.3

(51) Int. Cl.
  *B05B 11/00* (2023.01)
  *B05B 11/10* (2023.01)
(52) U.S. Cl.
  CPC ....... *B05B 11/1009* (2023.01); *B05B 11/1045* (2023.01)
(58) Field of Classification Search
  CPC ............. B05B 11/1009; B05B 11/1045; B05B 11/1011; B05B 11/0008; B05B 11/007; B05B 11/1069; B05B 11/1077; B05B 11/1002; Y02A 40/22
  See application file for complete search history.

(56) References Cited

U.S. PATENT DOCUMENTS

| | | | | |
|---|---|---|---|---|
| 5,169,032 A | * | 12/1992 | Steijns | B05B 11/0029 222/153.07 |
| 2007/0210117 A1 | * | 9/2007 | Foster | B05B 11/1064 222/340 |
| 2012/0234871 A1 | * | 9/2012 | Good | B05B 11/1045 222/382 |
| 2012/0286069 A1 | * | 11/2012 | Foster | B05B 11/1077 239/333 |
| 2014/0014691 A1 | * | 1/2014 | Foster | B05B 11/1064 222/383.1 |

FOREIGN PATENT DOCUMENTS

CN 201313084 Y 9/2009

* cited by examiner

*Primary Examiner* — Vishal Pancholi
(74) *Attorney, Agent, or Firm* — Oliff PLC

(57) ABSTRACT

An all-plastic miniaturized spray gun including an inner hole of a piston bush with a lower elastic sleeve, upper and lower ends of a piston cavity in an inlet hole of a body are respectively provided with an upper thru-hole and a lower thru-hole. An upper elastic sleeve is disposed above an inner hole of a piston bush in an inlet hole on the body between the upper thru-hole and the lower thru-hole. The upper elastic sleeve is abutted against the piston bush and fixed in the inlet hole of the body. A diversion groove is disposed on an inner wall of the inlet hole of the body. The inlet hole of the body is tapered and corresponds to the upper elastic sleeve. The upper elastic sleeve includes a second piston and a cover, and the lower thru-hole of the body can be opened and closed.

7 Claims, 5 Drawing Sheets

ALL-PLASTIC MINIATURIZED SPRAY GUN

TECHNICAL FIELD

The present disclosure relates to a miniaturized spray gun, which is a new type of all-plastic miniaturized spray gun.

BACKGROUND

Miniaturized spray gun, also named as "miniaturized atomizer", drives a piston to move in the pump body to cause air flows in the pump body. The internal pressure is reduced while the external pressure stays the same, resulting differential pressure in and out of the pump body. This differential pressure diverts liquids out of the pump body. When encountering high-speed airflows, liquids will be instantly atomized. The components of some existing micro-sprayers are made of all-plastic structure, which is convenient for recycling and reuse; for instance, patent number 200820168435.7 disclosed in the Chinese patent document, date of publication: 23 Sep. 2009, new utility name: "All-plastic Spray Gun". However, the inlet holes of all-plastic structures of the said product and other like products can open and close valves by single elastic bush structure and thru-hole structure in a piston cavity, which can hardly ensure that the internal pressure in piston cavity can drive liquids to the body and internal liquids can be stably sprayed out by pressure, and can hardly further improve the spraying effect.

SUMMARY

Aimed at overcoming the said deficiencies, the object of the present disclosure is to provide a new all-plastic miniaturized spray gun, so that it can solve the technical problems of existing similar all-plastic products including low pressure and poor spraying and feeding effects due to poor design of inlet holes and piston cavities. The object can be achieved through the technical solutions as described below.

A new all-plastic miniaturized spray gun, the body and the inner passage of the said miniaturized spray gun are L-shaped, a cover is disposed on the outer diameter of the body, a piston bush is disposed in the inner ring groove at the inlet of the body, a suction pipe is provided in the inner hole of the piston bush, a large ring is provided on the outer diameter of the inlet hole of the body outward of the piston bush, a piston cavity is disposed in the piston cylinder on one side of the wrench of the body, a piston is disposed in the piston cavity of the body, the piston on one end of the piston is fit into the piston cavity of the body, the sealing blade on the outer diameter of piston is abutted against the inner diameter of the piston cavity of the body, the other end of the piston is fit and abutted against the wrench, one end of the wrench is fixed to the pins on the outer diameter on both sides of the outlet hole of the body, a plastic spring is disposed on the outer diameter of the piston cavity of the body, the plastic spring appears to be arch-bent, one end of the plastic spring is abutted against the outer diameter of the inlet hole of the body, the other end of the plastic spring is abutted against the stop rib or wrench on the outer diameter of the outlet hole of the body, a head cap is disposed in the outlet hole of the body; wherein the inner hole of the said piston bush is provided with a lower elastic sleeve; the upper and lower ends of the piston cavity in the inlet hole of the body are respectively provided with an upper thru-hole and a lower thru-hole; the lower elastic sleeve is disposed above the inner hole of the piston bush in the inlet hole on body between the said upper thru-hole and the lower thru-hole; the upper elastic sleeve is abutted against the piston bush and fixed in the inlet hole of the body; a diversion groove is disposed on the inner walls of the inlet hole on body; the lower thru-hole of the body is normally open; when the upper thru-hole of the body drives the piston to move inwardly through a wrench, the lower elastic sleeve is stressed subject to pressure change, thus controlling the opening or closure of the inlet hole on body, and the upper elastic sleeve is deformed subject to pressure change, thus opening or closing the upper thru-hole of the body. The said lower elastic sleeve is an elastic part, a plastic part or a plastic ball, i.e.: a lower elastic sleeve is made of rubber material where appropriate, or a lower bush made of plastic material, or a plastic ball stopped in the inner hole, which can control the feed rate of liquids at the opening or closure of passage.

The said water inlet of the said body (1) is appears to be tapered and its corresponding upper elastic sleeve appears to be tapered. The said structure can make it convenient to fix the upper elastic sleeve and the inlet hole of the body, and also increase the internal pressure in the body by making use of the transition from large diameter to small diameter in the inlet hole of the body.

The said elastic sleeve comprises a piston and a cover, the cover mouth at one end of the cover bottom is hermetically fit to the column at one end of the piston, the cover mouth is joined to the head section at the other end of the piston, the diameter of the cylindrical end is larger than that of the cylinder at the other end of the cover, the height of the piston column is smaller than that of the cover, a column cavity is provided inside the spring, and the cover is located at the upper thru-hole of the body. The said structure is a specific structural embodiment of the upper elastic sleeve and the elastic cover is an elastic part.

The said protruded cross rib is disposed at the bottom of the piston of the said upper elastic sleeve, and the lower elastic sleeve is replaced by a plastic part. The plastic part in the top inner hole of the piston bush floats up and down in the clearance at the bottom of the said cross rib.

The said upper elastic sleeve comprises a seat and a hood. The said seat and hood are sleeved as one piece and appear to be tapered, the center hole in the seat is connected with the inner cover cavity of the hood, and the hood is located in the upper thru-hole of the body. The said structure is a specific structural embodiment of another kind of upper elastic sleeve and the hood is an elastic part.

The said protruded ring is provided between the upper thru-hole and the lower thru-hole in the piston cavity of the body. The said ring corresponds to a flared ring groove at the bottom of the piston part. The said structure makes it convenient to locate and stop the piston when pushed to the bottom.

The said conical inner cavity is provided in the flared ring groove at one end of the piston part in the piston cavity of the body. The said structure further expands the cavity space between the piston cavity and the piston on body, which in turn increases the pressure in the said cavity.

The said ball joint is disposed at one end of the wrench of the said piston part, the piston part is kinetically fit and fixed by the inner ball groove disposed between the ball joint and the wrench, a triangular reinforcing rib is disposed on the outer diameter of the ball joint rod of the ball joint, equally spaced rib grooves are disposed on the outer diameter between the lower part of the reinforcing rib and the piston blade, and the piston blade and the hole mouth of the piston part form a double-layer seal. The said piston structure improves the engagement with the wrench, the sealing performance of the piston cavity, and the overall strength and service life of the piston.

The said hook catching groove protruding toward one side of the wrench is disposed on one end of the said plastic spring. The plastic spring is fit and fixed to the connecting rib on the outer diameter of the body by the hook catching groove, and the end grooves on both sides of the rear part of the hook catching groove are abutted and fit to the trapezoidal rib of the body. The trapezoidal rib of the body is disposed on both sides of the ring face on the top outer diameter of the inner ring at the inlet hole. The trapezoidal rib is an inverted rib that is smaller at the bottom and larger on the top. One end of the wrench of the plastic spring is symmetrically provided with an open-ended clasp. The plastic spring is abutted against the stop rib or wrench on the outer diameter of the outlet hole of the body by clasp. The said structure is a specific structural embodiment of the plastic spring, which can effectively prevent breakage during the stretching deformation of both sides after the plastic spring is subject to force, and can also fix the plastic spring outwardly of the body without peeling off.

A notch is provided on one side of the top hole mouth of the inner hole of the said piston bush, and the said notch is aligned with the lower thru-hole in the body. The said structure is a specific structural embodiment of the top inner hole of the piston bush, which can control the length of the inlet hole in the body and the height of the top inner hole of the piston bush.

The said protruded seal ring is disposed on the outer diameter of the said piston bush, an air hole is provided on one side of the tabletop above the seal ring, and an inner hole is provided on the other side of it. The inner hole protrudes upwards and downwards respectively. A protruded catching ring is disposed along the top edge of the tabletop, the piston bush is fixed onto the ring groove at the inlet hole of the body by catching ring, and the air hole of the piston bush is located in the cavity groove underneath the connecting rib of the body. The said structure is a specific structural embodiment of the piston bush, which makes it convenient for the piston bush to securely engage and seal with the body.

The present structure is designed with reasonable structure, the space and pressure in the piston cavity are large, with good spraying and feeding effect, stability and sealing performance; it can be suitably used as all-plastic miniaturized spray gun, or as a modified structure of like products.

DRAWING SERIAL NUMBERS AND DESIGNATIONS

Figure 1:
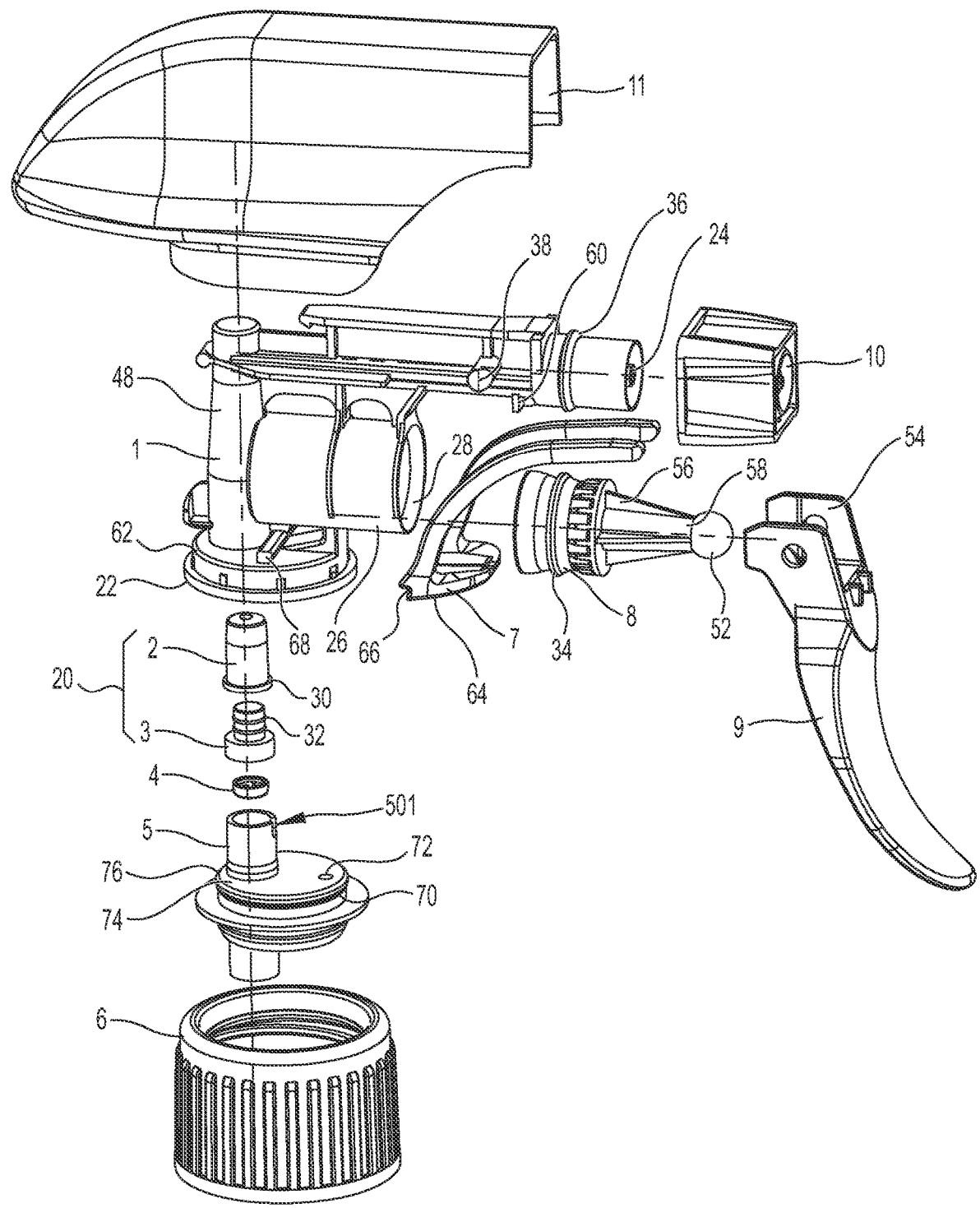
FIG. 1 is a schematic diagram of an explosion structure according to an embodiment of the present disclosure.
Figure 2:
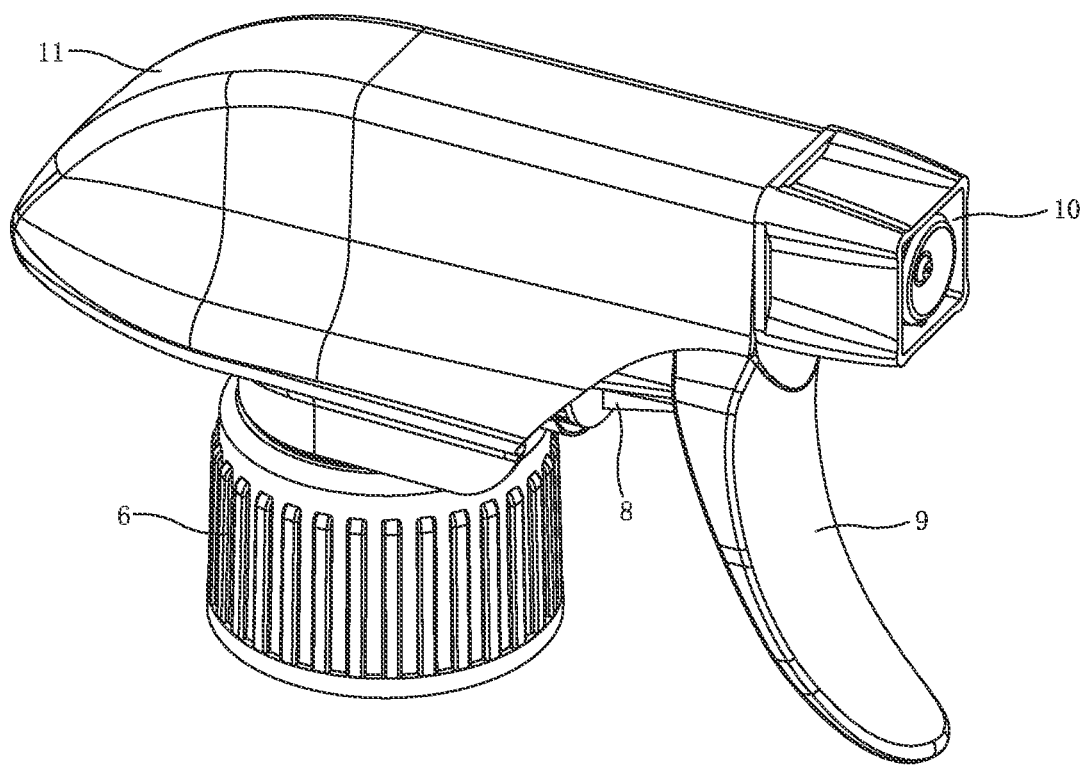
FIG. 2 is a schematic perspective view of FIG. 1.
Figure 3:
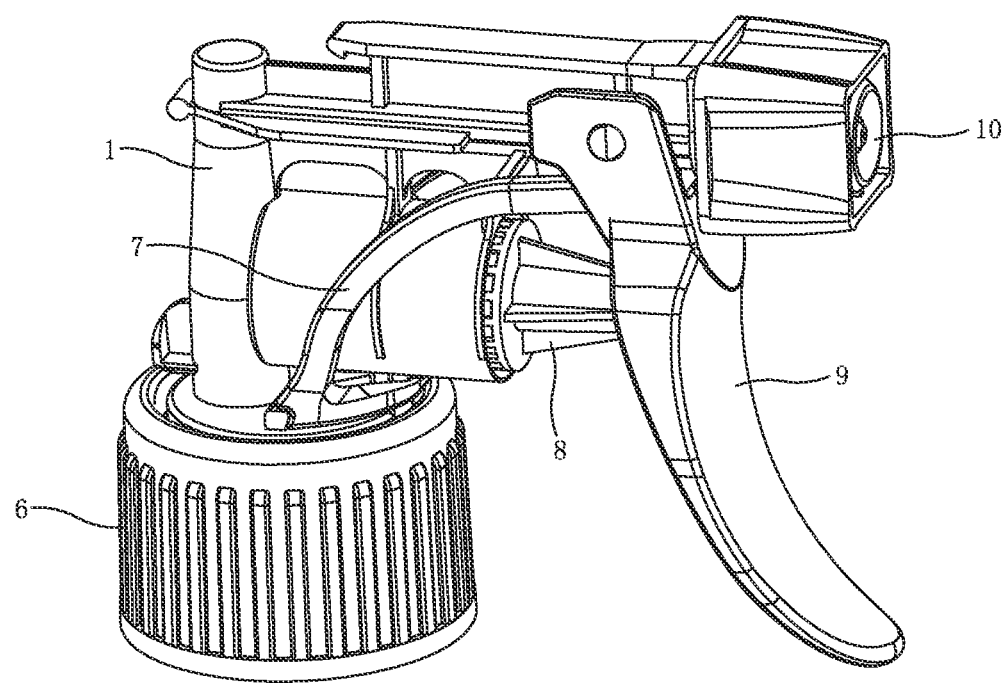
FIG. 3 is a schematic view of the inner structure of the casing of FIG. 2, with the hood omitted here.
Figure 4:
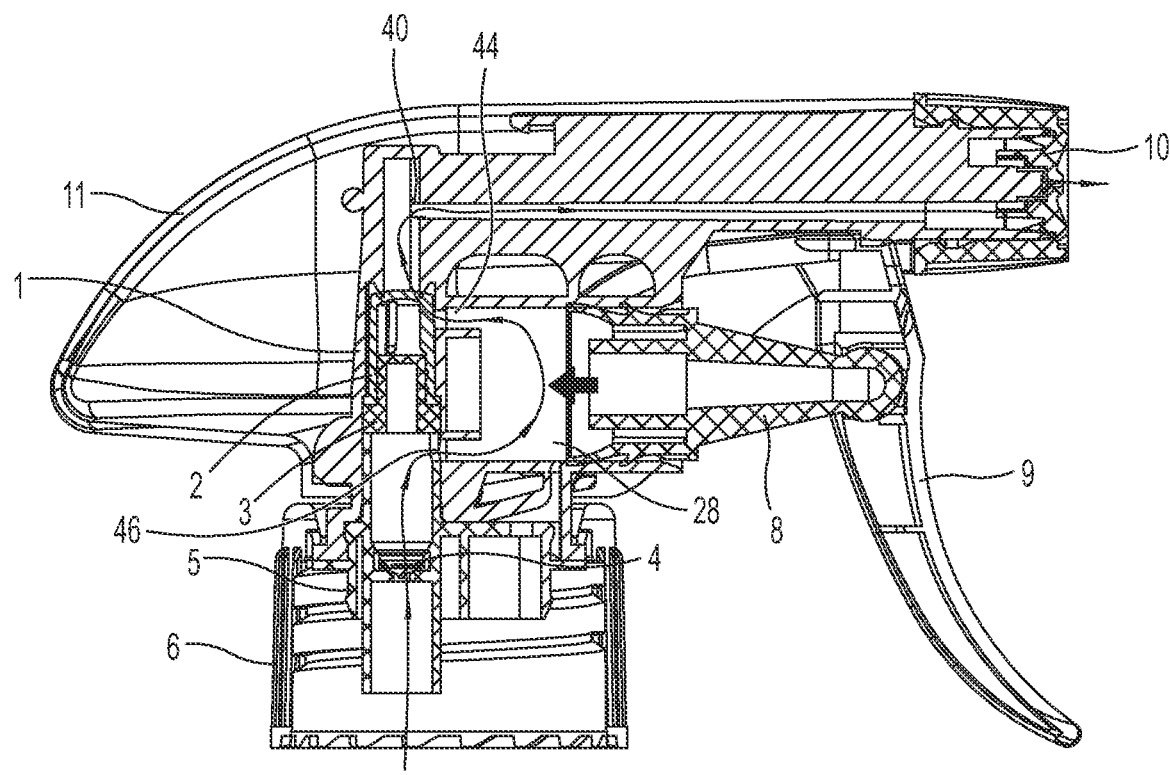
FIG. 4 is a schematic cross-sectional structure diagram of FIG. 2, where the arrows as shown in the figure indicate the feeding direction and the pushing direction of the piston part.
Figure 5:
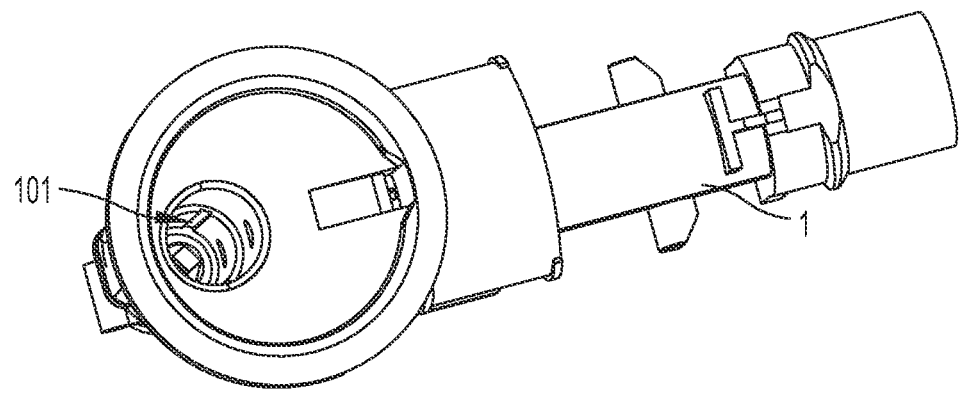
FIG. 5 is a schematic view of the bottom structure of the body of FIG. 1.

1. Body, 101, Diversion groove, 2. Lower hood, 3. Piston, 4. Cover, 5. Piston bush, 501. Notch 6. Large ring, 7. Plastic spring, 8. Piston part, 9. Wrench, 10. Head cap, 11. cover, 12. Elastic seat, 13. Hood.

DETAILED DESCRIPTION

Now referring to the accompanying drawings, the structure and use of an embodiment will be further described. According to the first embodiment as shown in FIGS. 1-5, the body 1 and the inner passage 40 of the said miniaturized spray gun are L-shaped, a cover 11 is disposed on the outer diameter of the body, a piston bush 5 is disposed in the inner ring groove at the inlet 22 of the body, a suction pipe is provided in the inner hole of the piston bush, a large ring 6 is provided on the outer diameter of the inlet hole 22 of the body outward of the piston bush, a piston cavity 26 is disposed in the piston cylinder 28 on one side of the wrench 9 of the body, a piston 8 is disposed in the piston cavity 26 of the body, the piston on one end of the piston is fit into the piston cavity 26 of the body, the sealing blade 34 on the outer diameter of piston is abutted against the inner diameter of the piston cavity 26 of the body, the other end of the piston is fit and abutted against the wrench, one end of the wrench is fixed to the pins 38 on the outer diameter on both sides of the outlet hole 24 of the body, a plastic spring 7 is disposed on the outer diameter of the piston cavity 26 of the body, the plastic spring appears to be arch-bent, one end of the plastic spring is abutted against the outer diameter of the inlet hole 22 of the body, the other end of the plastic spring is abutted against the stop rib 36 or wrench on the outer diameter of the outlet hole 24 of the body, a head cap 10 is disposed in the outlet hole 24 of the body; wherein the inner hole of the said piston bush 5 is provided with a lower elastic sleeve 4; the upper and lower ends of the piston cavity 26 in the inlet hole 22 of the body 1 are respectively provided with an upper thru-hole 44 and a lower thru-hole 46; the lower elastic sleeve 4 is disposed above the inner hole of the piston bush in the inlet hole 22 on body between the said upper thru-hole 44 and the lower thru-hole 46; the upper elastic sleeve 20 is abutted against the piston bush and fixed in the inlet hole 22 of the body; a diversion groove 101 is disposed on the inner walls of the inlet hole 22 on body. The water inlet 48 of the said body is appears to be tapered and its corresponding upper elastic sleeve 20 appears to be tapered; the upper elastic sleeve 20 comprises a piston 3 and a cover 2, the cover mouth 30 at one end of the cover bottom is hermetically fit to the column 32 at one end of the piston, the cover mouth 30 is joined to the head section at the other end of the piston, the diameter of the cylindrical end is larger than that of the cylinder at the other end of the cover, the height of the piston column 32 is smaller than that of the cover, a column cavity is provided inside the spring, and the cover is located at the upper thru-hole 44 of the body.

Meanwhile, a protruded ring is provided between the upper thru-hole 44 and the lower thru-hole 46 in the piston cavity 26 of the body. The said ring corresponds to a flared ring groove at the bottom of the piston part; a conical inner cavity is provided in the flared ring groove at one end of the piston part in the piston cavity 26 of the body. A ball joint 52 is disposed at one end of the wrench of the said piston part, the piston part is kinetically fit and fixed by the inner ball groove 54 disposed between the ball joint 52 and the wrench, a triangular reinforcing rib 56 is disposed on the outer diameter of the ball joint rod 58 of the ball joint 52, equally spaced rib grooves are disposed on the outer diameter between the lower part of the reinforcing rib and the piston blade, and the piston blade and the hole mouth of the piston part form a double-layer seal. A hook catching groove 64 protruding toward one side of the wrench is disposed on one end of the said plastic spring. The plastic spring is fit and fixed to the connecting rib 62 on the outer diameter of the body by the hook catching groove 64, and the end grooves 66 on both sides of the rear part of the hook catching groove 64 are abutted and fit to the trapezoidal rib 68 of the body. The trapezoidal rib 68 of the body is disposed on both sides of the ring face on the top outer diameter of the inner ring at the inlet hole. The trapezoidal rib 68 is an inverted rib that is smaller at the bottom and larger on the top. One end of the wrench of the plastic spring is symmetrically provided with an open-ended clasp 60. The plastic spring is abutted against the stop rib 36 or wrench on the outer diameter of the outlet hole 24 of the body by clasp. A notch 501 is provided on one side of the top hole mouth of the inner hole of the said piston bush, and the said notch is aligned with the lower thru-hole in the body. A protruded seal ring 70 is disposed on the outer diameter of the said piston bush, an air hole 72 is provided on one side of the tabletop 74 above the seal ring 70, and an inner hole is provided on the other side of it. The inner hole protrudes upwards and downwards respectively. A protruded catching ring 76 is disposed along the top edge of the tabletop 74, the piston bush is fixed onto the ring groove at the inlet hole 22 of the body by catching ring 76, and the air hole 72 of the piston bush is located in the cavity groove underneath the connecting rib 62 of the body.

When in use, push the wrench, the lower thru-hole of the body is normally open. When the upper thru-hole 44 of the body is pushed by the wrench to drive the piston inwardly, the lower elastic sleeve 4 is controlled by the pressure change to close the inlet hole 22 of the body. At the same time, the upper elastic sleeve 20 is subject to stress deformation due to internal pressure of the piston cavity 26, the flow of liquids between the upper thru-hole 44 of the body and the inner passage is opened, until atomized and sprayed out of the head cap. Release the wrench, the upper elastic sleeve 20 is subject to stress deformation due to internal pressure of the piston cavity 26, the flow of liquids between the upper thru-hole 44 of the body and the inner passage is closed, the lower elastic sleeve 4 suctions upwardly, the inlet hole 22 of the body opens, and liquids flow into the body by piston bush.

Figure 6:
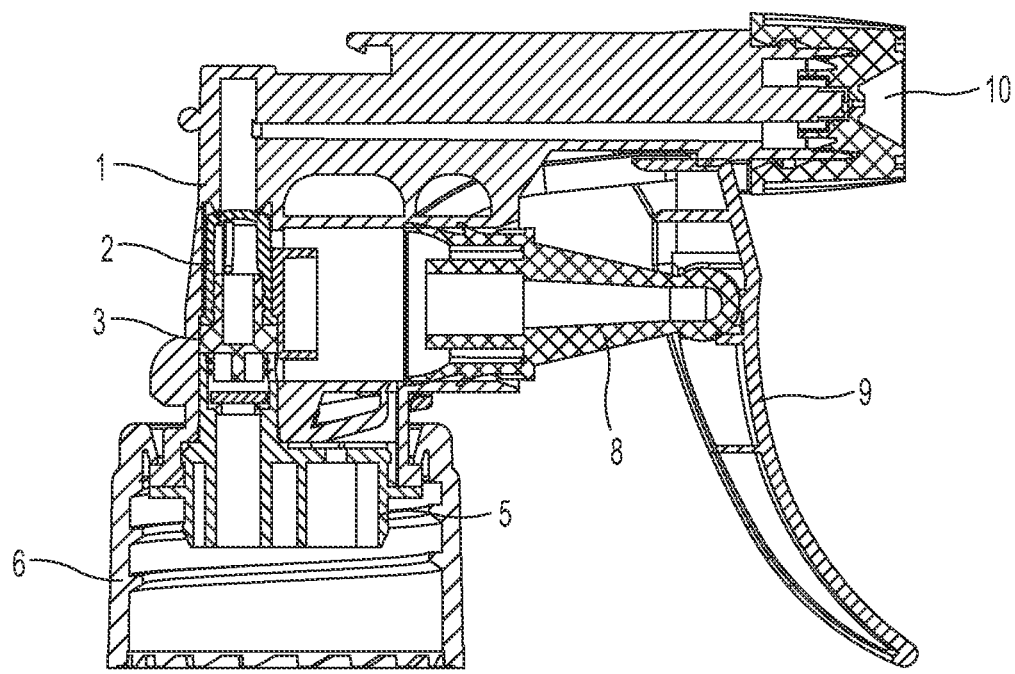
FIG. 6 is a schematic sectional view of the modified sectional structure of FIG. 4, with the hood omitted here.
Figure 7:
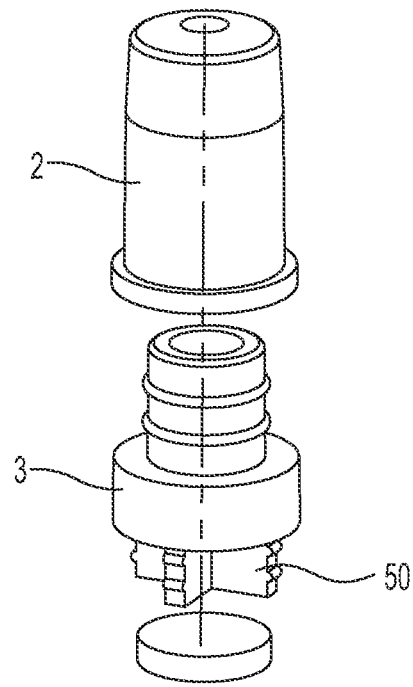
FIG. 7 is a schematic diagram of the explosion structure of the upper elastic sleeve of FIG. 6.
Figure 8:
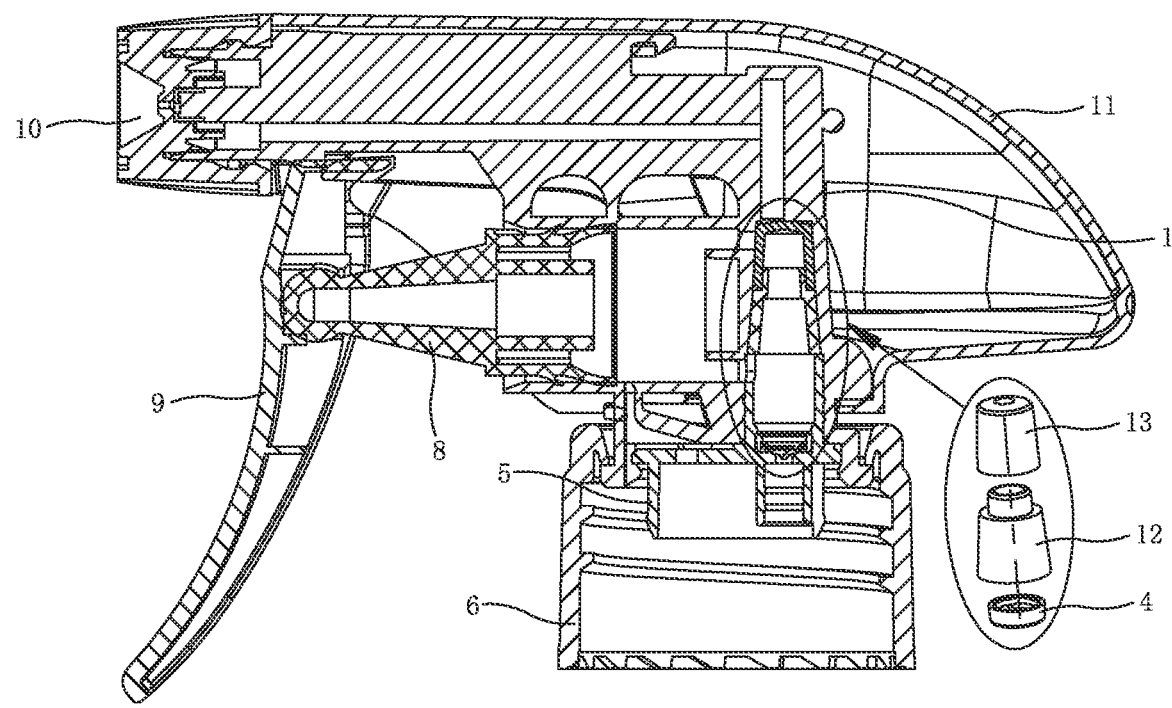
FIG. 8 is a schematic cross-sectional view of the second embodiment of the present disclosure, where the upper elastic sleeve lead-out is opened.
Figure 9:
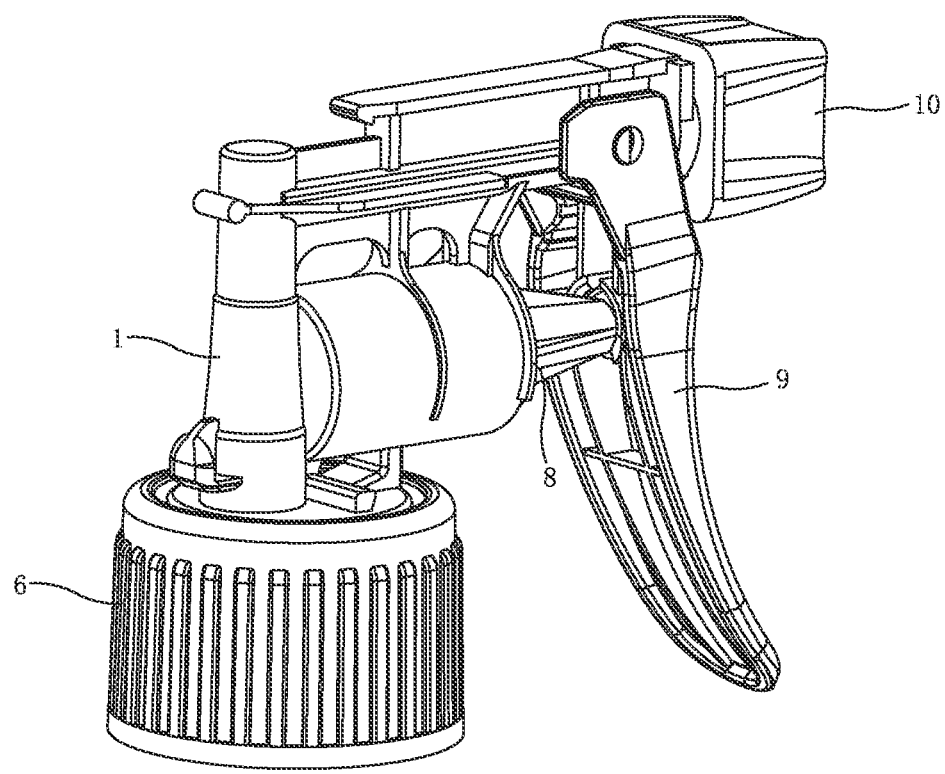
FIG. 9 is a schematic diagram of the internal structure of the casing shown in FIG. 8, with the hood omitted here.

According to the structure and characteristics of the first embodiment as described above, referring to FIGS. 6 and 7, a protruded cross rib 50 is disposed at the bottom of the piston of the said upper elastic sleeve 20, the lower elastic sleeve 4 is replaced by a plastic part. The plastic part in the top inner hole of the piston bush floats up and down in the clearance at the bottom of the said cross rib, so that the inner hole of the piston bush opens and closes, according to the second embodiment as shown in FIGS. 8 and 9, the structure of the upper elastic sleeve 20 can also be replaced by an elastic seat 12 and a hood 13. The said seat and hood are sleeved as one piece and appear to be tapered, the center hole in the seat is connected with the inner cover cavity of the hood, and the hood is located in the upper thru-hole 44 of the body, so that liquids can suction and spray out.

The invention claimed is:
1. An all-plastic miniaturized spray gun, comprising:
a body and an inner passage of the miniaturized spray gun that are L-shaped,
a cover disposed on an outer diameter of the body,
a piston bush disposed in an inner ring groove at an inlet of the body,
the piston bush being configured to accommodate a suction pipe at an inner hole of the piston bush,
a large ring provided on an outer diameter of an inlet hole of the body outward of the piston bush,
a piston cavity disposed in a piston cylinder on one side of a wrench of the body,
a piston disposed in the piston cavity of the body, wherein the piston on one end of the piston is fit into the piston cavity of the body, a sealing blade on an outer diameter of the piston is abutted against an inner diameter of the piston cavity of the body, an end of the piston opposite of the piston cavity, is fit and abutted against the wrench, and one end of the wrench is fixed to pins on an outer diameter on two sides of an outlet hole of the body,
a plastic spring disposed on an outer diameter of the piston cavity of the body, the plastic spring being arch-bent with one end of the plastic spring abutted against the outer diameter of the inlet hole of the body, and another end of the plastic spring abutted against a stop rib or wrench on an outer diameter of the outlet hole of the body, and
a head cap disposed in the outlet hole of the body; wherein
the inner hole of the piston bush is provided with a lower elastic sleeve;
an upper end and a lower end of the piston cavity in the inlet hole of the body are respectively provided with an upper thru-hole and a lower thru-hole;
the lower elastic sleeve is disposed above the inner hole of the piston bush in the inlet hole on body between the upper thru-hole and the lower thru-hole;
the upper elastic sleeve is abutted against the piston bush and fixed in the inlet hole of the body;
a diversion groove is disposed on an inner wall of the inlet hole on the body;
the lower thru-hole of the body is configured to be opened and closed;
when the upper thru-hole of the body drives the piston to move inwardly through a wrench, the lower elastic sleeve is configured to be stressed subject to a pressure change, thus controlling an opening or closure of the inlet hole on the body, and the upper elastic sleeve is configured to be deformed subject to the pressure change, thus opening or closing the upper thru-hole of the body;
a water inlet of the body is tapered and its corresponding upper elastic sleeve is tapered;
the upper elastic sleeve comprises a second piston and a cover;
a cover mouth at one end of a cover bottom is hermetically fit to a column at one end of the second piston, the cover mouth is joined to a head section at another end of the second piston opposite of the column, a diameter of a cylindrical end of the cover is larger than that of a cylinder at an opposite end of the cover;
a height of the column is smaller than that of the cover;
a column cavity is configured to be provided inside a spring;

the cover is located at the upper thru-hole of the body;
a notch is provided on one side of a top hole mouth of the inner hole of the piston bush; and
the notch is aligned with the lower thru-hole in the body.

2. The all-plastic miniaturized spray gun according to claim 1, wherein a protruded cross rib is disposed at a bottom of the second piston of the upper elastic sleeve, the lower elastic sleeve is a plastic part, and the plastic part is positioned in a top inner hole of the piston bush and configured to float up and down in a clearance at a bottom of the protruded cross rib.

3. The all-plastic miniaturized spray gun according to claim 1, wherein the upper elastic sleeve comprises a seat and a hood, the seat and hood are sleeved as one piece and are tapered, a center hole in the seat is connected with an inner cover cavity of the hood, and the hood is located in the upper thru-hole of the body.

4. The all-plastic miniaturized spray gun according to claim 1, wherein a protruded ring is provided between the upper thru-hole and the lower thru-hole in the piston cavity of the body, and the protruded ring corresponds to a flared ring groove at a bottom of the piston; and a conical inner cavity is provided in the flared ring groove at one end of the piston in the piston cavity of the body.

5. The all-plastic miniaturized spray gun according to claim 1, wherein a ball joint is disposed at one end of the wrench, the piston is kinetically fit and fixed by an inner ball groove disposed between the ball joint and the wrench, a triangular reinforcing rib is disposed on an outer diameter of a ball joint rod of the ball joint, equally spaced rib grooves are disposed on the outer diameter of the piston between a lower part of the triangular reinforcing rib and the sealing blade, and the sealing blade and a hole mouth of the piston form a double-layer seal.

6. The all-plastic miniaturized spray gun according to claim 1, wherein a hook catching groove protruding toward one side of the wrench is disposed on one end of the plastic spring, the plastic spring is fit and fixed to a connecting rib on an outer diameter of the body by the hook catching groove, and end grooves on both sides of rear part of the hook catching groove are abutted and fit to a trapezoidal rib of the body, the trapezoidal rib of the body is disposed on two sides of a ring face on a top outer diameter of an inner ring at the inlet hole, the trapezoidal rib is an inverted rib that is smaller at a bottom and larger on a top, one end of the wrench at an end with the plastic spring is symmetrically provided with an open-ended clasp, and the plastic spring is abutted against the stop rib or the wrench on the outer diameter of the outlet hole of the body by the open-ended clasp.

7. The all-plastic miniaturized spray gun according to claim 1, wherein a protruded seal ring is disposed on an outer diameter of the piston bush, an air hole is provided on one side of a tabletop above the protruded seal ring, and an inner hole is provided on another side of the tabletop; the inner hole protrudes upwards and downwards respectively; a protruded catching ring is disposed along a top edge of the tabletop, the piston bush is fixed onto the ring groove at the inlet hole of the body by the catching ring, and the air hole of the piston bush is located in a cavity groove underneath a connecting rib of the body.

* * * * *